United States Patent
Sandes et al.

(10) Patent No.: US 7,332,133 B2
(45) Date of Patent: Feb. 19, 2008

(54) CYCLONE SYSTEM FOR DISENGAGING SOLID AND GASEOUS PARTICLES IN FCC SYSTEMS WITH REDUCED COKE FORMATION IN DISENGAGER VESSELS

(75) Inventors: Emanuel Freire Sandes, Niterói (BR); Paulo Sérgio Freire, Rio de Janeiro (BR); José Geraldo Furtado Ramos, Rio de Janeiro (BR); Aurélio Medina Dubois, Rio de Janeiro (BR); José Mozart Fusco, Niterói (BR); Eduardo Cardoso de Melo Guerra, Petrópolis (BR); Wilson Kenzo Huziwara, Rio de Janeiro (BR)

(73) Assignee: Petroleo Brasileiro S.A. - Petrobras, Rio De Janeiro (BR)

( * ) Notice: Subject to any disclaimer, the term of this patent is extended or adjusted under 35 U.S.C. 154(b) by 695 days.

(21) Appl. No.: 10/814,641

(22) Filed: Apr. 1, 2004

(65) Prior Publication Data

US 2004/0234425 A1   Nov. 25, 2004

(51) Int. Cl.
*B32B 5/02* (2006.01)
*B01D 19/00* (2006.01)

(52) U.S. Cl. .................... 422/144; 422/147; 55/396
(58) Field of Classification Search .............. 422/144, 422/147; 208/113, 168; 55/348, 396
See application file for complete search history.

(56) References Cited

U.S. PATENT DOCUMENTS

| | | | | |
|---|---|---|---|---|
| 4,623,446 A * | 11/1986 | Haddad et al. | ............. | 208/113 |
| 4,749,471 A * | 6/1988 | Kam et al. | .................. | 208/113 |
| 5,449,498 A * | 9/1995 | Cetinkaya | .................... | 422/144 |
| 5,538,696 A * | 7/1996 | Raterman et al. | ........... | 422/147 |
| 5,569,435 A * | 10/1996 | Fusco et al. | ................. | 422/147 |
| 5,643,537 A * | 7/1997 | Raterman et al. | ........... | 422/147 |
| 5,681,450 A * | 10/1997 | Chitnis et al. | .............. | 208/113 |
| 6,743,401 B2 * | 6/2004 | Guerra | ........................ | 422/147 |
| 6,797,026 B2 * | 9/2004 | Sechrist et al. | ............... | 55/348 |

\* cited by examiner

*Primary Examiner*—N. Bhat
(74) *Attorney, Agent, or Firm*—Sughrue Mion, PLLC.

(57) ABSTRACT

An improved cyclone system for disengaging solid and gaseous particles in fluid catalytic cracking (FCC) processes with reduced coke formation in disengager vessels, without favoring release of the disengaged catalyst into cyclones in subsequent stages, said system comprising legless cyclones 42 fitted with external collector pipes 43, is described.

The collector pipes 43 optimize the purge of gases coming from the disengager vessel 49, reducing the time the hydrocarbons remain inside said disengager vessel 49, thus preventing overcracking and subsequent coke formation. Positioning of the external collector pipes 43 prevents release of the disengaged catalyst into cyclones in subsequent stages.

The present invention also relates to a process and device for disengaging solid and gaseous particles in fluid catalytic cracking (FCC) processes, reducing coke formation in disengager vessels and minimizing the release of catalyst into consecutive stages, said process and device being part of the system of the present invention.

20 Claims, 6 Drawing Sheets

FIG. 1

Prior Art

FIG. 2

Prior Art

FIG. 3A

Prior Art

FIG. 3B

Prior Art

FIG. 3C

Prior Art

CYCLONE SYSTEM FOR DISENGAGING SOLID AND GASEOUS PARTICLES IN FCC SYSTEMS WITH REDUCED COKE FORMATION IN DISENGAGER VESSELS

FIELD OF THE INVENTION

The present invention relates to an improved cyclone system for disengaging solid and gaseous particles in fluid catalytic cracking (FCC) processes with reduced coke formation in the disengager vessel, without causing the disengaged catalyst to be released. More particularly, the present patent application relates to a closed, unconfined system for the cyclone disengagement of solid particles (catalyst) and effluent gases from the riser during fluid catalytic cracking (FCC) processes, whereby the process for removing remaining hydrocarbons in the disengager vessel is optimized, with no loss of disengaging efficiency and thereby minimizing coke deposition during the process.

The system of the present invention comprises legless cyclones fitted with external collector pipes to optimize the purging of gases coming from the disengager vessel and avoid the release of the disengaged catalyst into cyclones in subsequent stages. Accordingly, hydrocarbons remain for a shorter time inside the disengager vessel, minimizing the chance of triggering coke formation.

The present invention also relates to a process and a device for disengaging solid and gaseous particles during fluid catalytic cracking (FCC) processes, with reduced coke formation and catalyst release, said process associated with the system of the present invention.

BACKGROUND OF THE INVENTION

Fluid catalytic cracking (FCC) processes originally used high alumina catalysts. In these processes, the hydrocarbon load was mixed with the fluidized catalyst and piped into a riser. The riser discharged the reaction products mixed with the catalyst onto a fluidized bed to bring a halt to the reactions.

The FCC processes next began using zeolite catalysts. Because they were more active than the alumina type, there was no longer the need for a catalytic bed.

Subsequent systems involved a longer riser so as to ensure the ballistic or inertial disengagement of the catalyst ("all riser cracking").

The technique was improved by the introduction of load dispersal devices and by pre-accelerating the catalyst to boost catalyst-load contact.

These improvements made cracking in the riser more selective and vigorous, leading to the need for more efficient devices for disengaging the products and the spent catalyst.

One solution for the technique involving this disengagement is to install cyclones directly coupled to the riser outlet.

Closed cyclone systems then emerged, aimed at reducing thermal overcracking due to hydrocarbons passing through the disengager vessel and the lengthy contact time between solid and gaseous particles. These systems made it possible for reaction products to go directly from the riser to the transfer line through cyclones with a shorter residence time of approximately one second or less.

The technique draws from various publications based on the concept of closed cyclones.

Some publications describe closed cyclone disengaging systems comprising cyclones fitted with a sealing leg for holding in the collected solids.

Other publications deal with closed disengaging systems that have a cyclone directly connected to the riser and with no sealing leg, and with a lower nozzle opening directly into the disengaging vessel, and which does not retain the disengaged solids.

Solids disengaged by the legless cyclone are discharged through its lower nozzle, with the large volume of the disengager vessel serving to reduce pressure variations in the riser.

Figure 1:
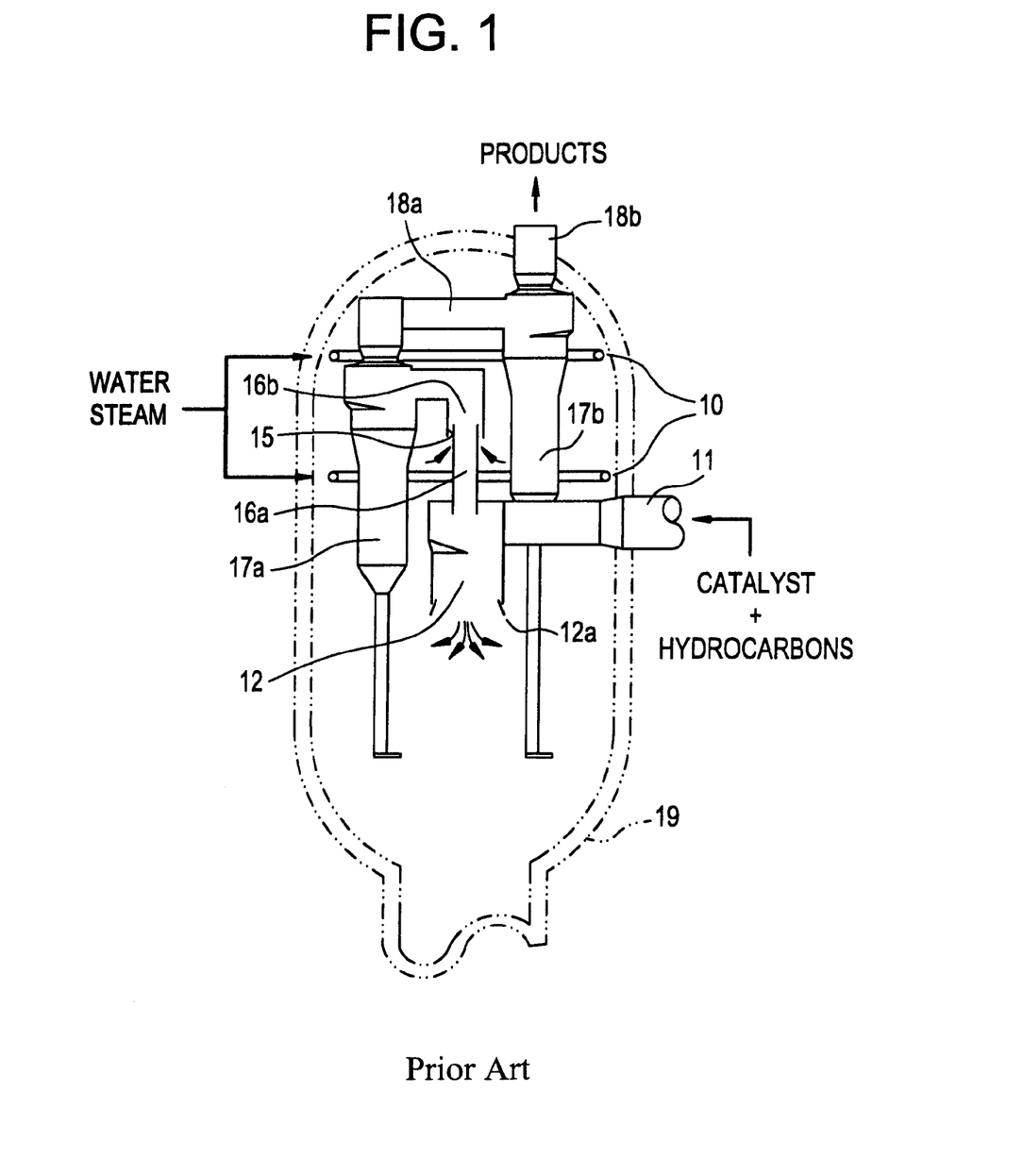

The Applicant's Brazilian patent PI 9303773, illustrated in the attached FIG. 1, describes a closed and unconfined cyclone disengaging system, comprising a disengager vessel 19 fitted with a cyclone 12 without a sealing leg directly connected to the riser 11, with the lower end of said cyclone 12 opening up directly into a large-volume disengager vessel 19.

Optionally, the lower nozzle of the cyclone 12 may contain one or more distributors 12a of solids to improve passing of the downward flow of the disengaged catalyst particles.

The legless cyclone 12 is interconnected to a primary cyclone 17a through concentric pipes 16a, 16b. The connection between the primary cyclone 17a and the secondary cyclone 17b is comprised of piping 18a.

Disengaged gases exit from the disengager vessel 19 through the outlet duct 18b. The annular space 15 between the pipes 16a, 16b connects the piping interior to the disengager vessel 19. Gases from the disengager vessel 19 drain through this opening. The purge liquid injector devices 10 help to drain the stagnated gases in the disengager vessel 19.

Figure 3A:
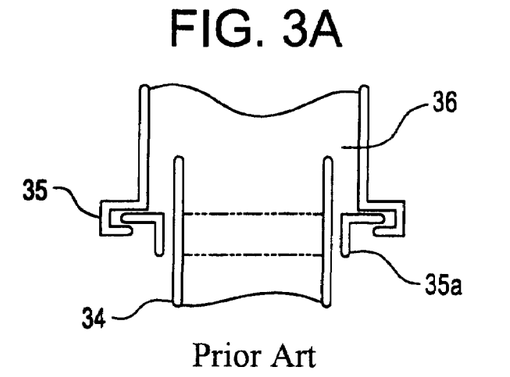
Figure 3B:
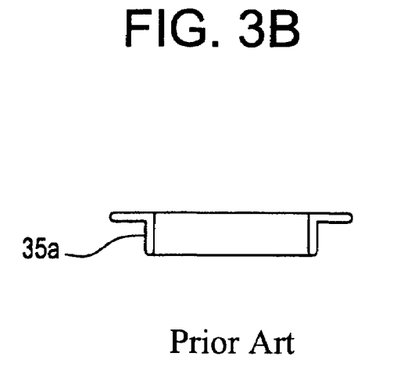
FIG. 3B, attached, shows a detail of the slip ring corresponding to Brazilian publication PI 9901484.

The Applicant's Brazilian publication PI 9901484, illustrated in attached FIGS. 3a and 3b, describes a device for controlling the flow of liquids through the annular space of telescoping joints, as well as how to employ this device. The device accordingly comprises a slip ring 35a coupled to connection ducts 34, 36 to ensure there will be an annular section with constant spacing in the area where the connection ducts 34, 36 are joined, with no structural damage from yielding to movement produced by changing temperatures.

Use of the slip ring 35a coupled to the telescoping joint 35 ensures a constant area for the passing of liquids and a controlled load loss to accommodate a given flow of liquids.

Figure 2:
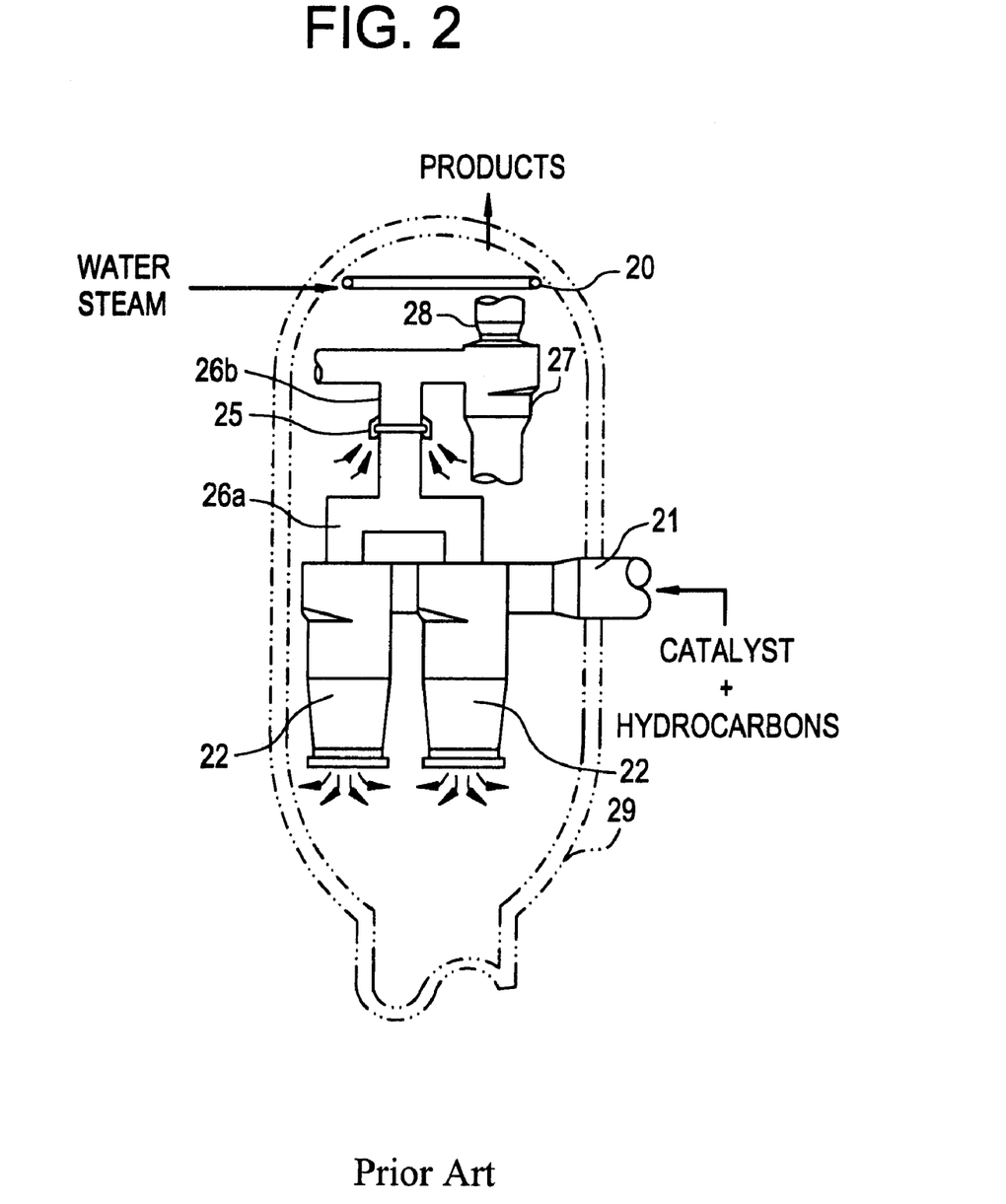
FIG. 2, attached, is a cutaway view of the disengaging section of an FCC unit corresponding to the prior art published in the Applicant's PI 0002087 wherein the riser 21 is directly connected to two first-stage cyclones 22, said cyclones 22 being interconnected by a single flow distributor 26a fitted with a telescoping joint 25 at its upper end connecting the pipe 26b. The disengager vessel 29 is equipped with purge liquid injector devices 20.

The Applicant's Brazilian publication PI 0002087, illustrated in the attached FIG. 2 describes a closed, unconfined cyclone disengager system, improved with flow distributors 26a, 26b to balance the gases coming from two or more cyclones in the same stage or between different stages.

FIG. 2 illustrates a right-angle sectional cutaway view of the disengager vessel 29 of an FCC unit wherein two first-stage cyclones 22 are connected to a flow distributor 26a.

The first-stage cyclones 22 are interconnected to the second-stage cyclones 27 through interconnection ducts 26b. There is a narrow passageway 25 in the interconnection duct 26b providing an outlet for the steam injected into the riser and the rectifier, as well as allowing some of the rectified hydrocarbons to be drawn off.

Steam is injected into the rectifier and the riser under various predetermined flows, programmed in accordance with unit operating conditions.

This procedure ensures a proper pressure balance around the legless cyclone, making it possible to alternate between purging and bleeding.

Purging is carried out under flow conditions, with a slight amount of steam from the disengager vessel 29 entering the legless cyclone 22 through the lower solid discharge nozzle.

Bleeding under flow conditions occurs with a slight amount of gas passing from the legless cyclone 22 into the disengager vessel 29.

In the system described in Brazilian publication PI 0002087, the overall efficiency of solid collection is considerably higher.

The use of technology for solid-gas disengaging through closed, (unconfined) legless cyclone systems in FCC processes described in the Applicant's Brazilian publications PI 0002087 and PI 9303773, included herein as references, reduces thermal cracking caused by the hydrocarbons passing through the disengager vessel, with highly efficient overall solid collection.

However, with these systems as described in prior art, even under purge conditions, most of the steam injected into the riser and the rectifier along with the hydrocarbons coming from rectification is captured through the nozzles located on the interconnection duct between the legless cyclone and the upper cyclone, or through a telescoping joint, with a smaller amount captured through the back flow passing through the lower end of the legless cyclone.

In addition, owing to the fact that most of the hydrocarbons are confined inside the cyclones, the area of the disengager vessel above the lower end of the legless cyclones has a lower temperature, inasmuch as virtually none of the currents with most of the energy (catalyst and hydrocarbons) pass through this part of the disengager vessel. Accordingly, the area between the lower end of the legless cyclones and the top of the disengager vessel has a negative temperature gradient; at the end of an operating run the top and bottom of the disengager vessel may show a temperature difference of as much as 100° C.

Under these conditions, the low remaining flow of hydrocarbons circulates through a part of the disengager vessel with a lower temperature before reaching the telescoping joint or the nozzles on the interconnection duct between the cyclones. Passage of these hydrocarbons through this cooler area of the disengager vessel, along with their extended residence time inside the vessel, enhances condensation and thermal cracking, which cause coke deposits to form inside the disengager vessel over time. This factor poses a risk for operating continuity of the converter, inasmuch as the loosening of pieces of coke could hamper circulation of the catalyst by blocking the rectifier and/or the standpipes.

Figure 3C:
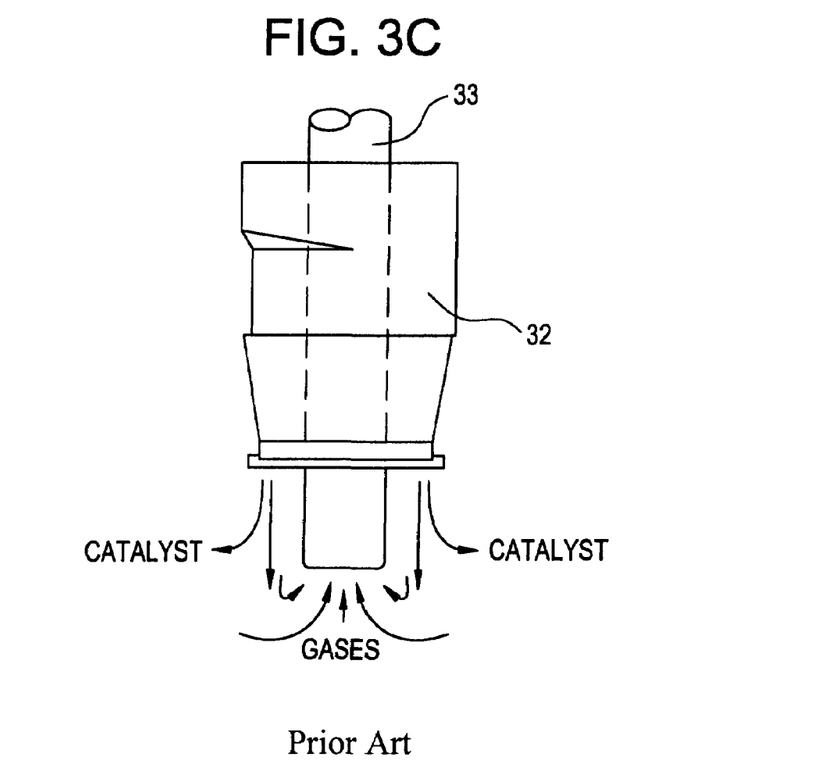
FIG. 3C, attached, shows a detail of the invention described in the Applicant's Patent Application PI 0203419-0, using a legless cyclone 32 fitted with internal piping 33, said piping 33 being open at both ends. The drawing also shows the flow of gases from the disengager vessel crossing through the curtain of spent catalyst, discharged through the lower nozzle of the legless cyclone 32 before arriving at the piping 33 inside said legless cyclone 32, releasing the catalyst into the piping 33.

One attempt to solve this problem, contained in prior art, is illustrated in the attached FIG. 3C, is described in the Applicant's patent application PI 0203419-0, which uses a legless cyclone 32 fitted with internal piping 33, said piping 33 having open ends. Patent application PI 0203419-0 utilizes a telescoping joint (not shown in FIG. 3C) in the riser inside the disengager vessel, required in order to accommodate thermal expansion. It should be mentioned that this combined solution does not apply to FCC converters whose riser is outside the disengager vessel.

Although this alternative reduces the problem of coking by capturing the hydrocarbons in a place beneath that where the gases described in the prior art are collected, it does not solve the problem efficiently, since it creates another related problem: release of the catalyst.

The piping 33 inside the legless cyclone 32 collects the gases coming from the disengager vessel, releasing part of the catalyst from the legless cyclone 32 into the internal piping 33, said catalyst being carried to the cyclones of the following stages. This release of catalyst reduces overall disengaging efficiency, increasing the concentration of solids in the disengager vessel effluent, as well as further eroding the cyclones in the following stages, which could significantly reduce run time for the unit.

This release hampers the disengagement stage between the spent catalyst and the hydrocarbons, since it carries the catalyst that had previously been disengaged by the legless cyclone 32 on to the next stage.

The catalyst fraction released into the piping 33 inside the legless cyclone may also lead to erosion of the piping 33 interior.

Another problem created by the fact of having piping inside the cyclone is that if the piping is punctured—which can happen at any time during the run owing to erosion—such will reduce the efficiency of the legless cyclone 32 because the solids inside of it will be shunted directly to the cyclones in the following stages.

Accordingly, the systems described in the prior art fail to efficiently solve the problem of coke deposition in the disengager vessel.

Coke deposition in the disengager vessel reduces the operating reliability of the unit, due to the constant risk of problems linked to hampered catalyst circulation caused by pieces of coke breaking loose. Moreover, maintenance (scheduled or otherwise) is more costly, because of the time it takes to remove the coke that has stuck tightly to the walls of the disengager vessel and its inner components.

Accordingly, the technique also requires a cyclonic system and a process for disengaging solid and gaseous particles in FCC processes that reduces coke formation without lowering disengagement efficiency nor threatening the integrity of the cyclones, with said system and process described in the body and claims of the present patent application.

SUMMARY OF THE INVENTION

Figure 4:
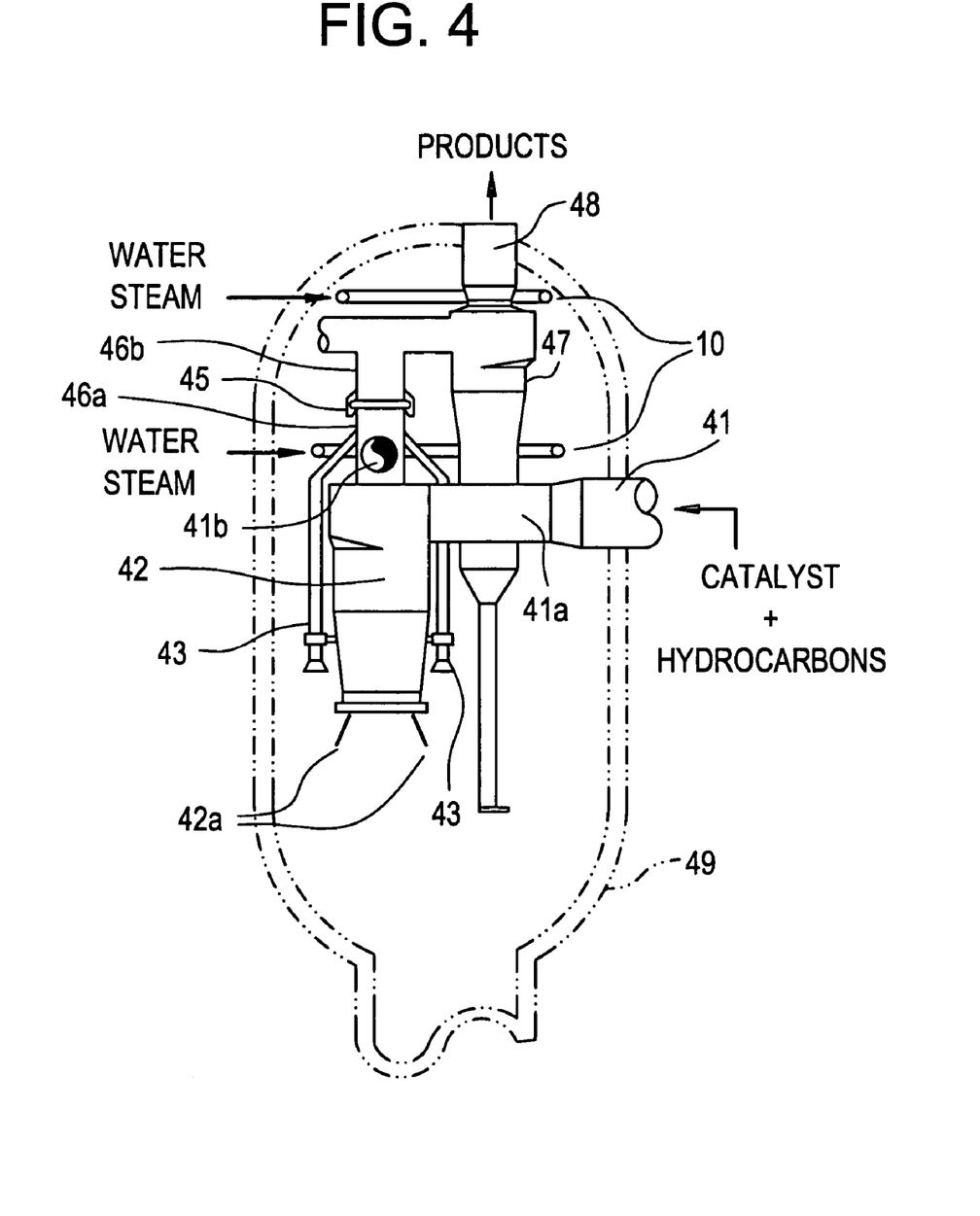
FIG. 4, attached, is an illustrative example, not to be construed as limitative, of one embodiment of the system of the present invention showing the disengager vessel 49 in a vertical cutaway front view, comprising the riser 41, directly interconnected to a legless cyclone 42, connected to the cyclone 47 by concentric pipes 46a, 46b, fitted with a telescoping joint 45 and external collector pipes 43. Effluent gases from the cyclone 47 exit through the duct 48. Purge liquid is injected by the injector devices 40. The legless cyclone 42 opens at its lower end into the disengager vessel 49, which as an alternative may be equipped with distributors of solids 42a. Optionally, the riser 41 may be directly connected to one or more legless cyclones 42 through one or more v-branches in the pipe 41*a*. The distributor 41*b* can be connected to one or more legless cyclones 42. The advantage of this second embodiment is that fewer telescoping joints or connections between the pipes are required.
Figure 5:
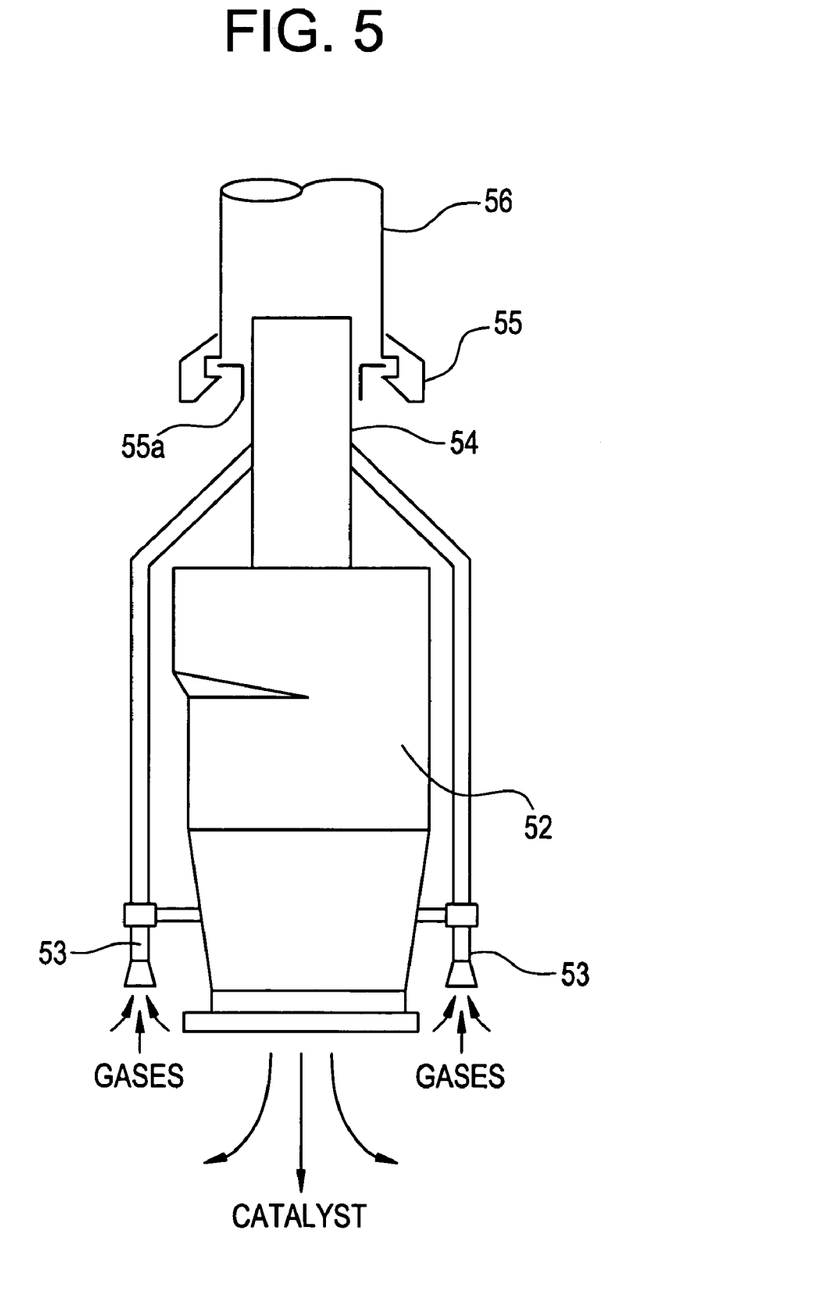
FIG. 5, attached, is an illustrative detail, not to be construed as limitative, of the system of the present invention showing the legless cyclone 52 connected to two external collector pipes 53 through concentric pipes 54, 56. In this embodiment, the system of the present invention is fitted with a telescoping joint 55 with a slip ring 55*a*.

The present invention, shown in FIG. 4, relates to a closed, unconfined cyclone system for disengaging solid and gaseous particles in FCC processes, with reduced coke formation in the disengager vessel wherein disengagement efficiency and cyclone integrity are maintained.

The system of the present invention comprises the insertion of at least one external collector pipe 43 connected to the outlet duct of the legless cyclone 42, said external collector pipe 43 extending parallel to the legless cyclone until reaching a nearby area, preferably beneath the lower nozzle of said cyclone 42. The legless cyclone 42 is connected to the first-stage cyclone 47 by concentric pipes 46a, 46b.

A telescoping joint 45 can be installed between the concentric pipes 46a, 46b, of a type discussed in the Applicant's publication PI 9901484, or another commercially available joint with minimum or no annular section (tight joint), intended to minimize the flow of gases through the joint, with no structural damage from yielding to movement produced by changing temperatures.

The steam injected into the dome of the disengager vessel 49 through the injector 40 ensures purging of the upper part, avoiding the possibility that there will be hydrocarbons in this part. No more than 20%, if any, of the total flow of injected steam escapes from the vessel through the minimum annular play of the telescoping joint 45. The remaining 80-100% continues toward the end of the external collector pipe 43, where it exits along with the steam and the hydrocarbons from the rectifier. Accordingly, the section between the top of the disengager vessel 49 and the end of the collection pipe 43 is efficiently purged.

Under these circumstances, at least one external collector pipe 43 captures the hydrocarbons coming from the rectifier and most of the steam injected into the disengager vessel and the rectifier in the area closest to where the catalyst and hydrocarbons from the legless cyclone 42 are discarded, thus preventing the hydrocarbons from circulating in the area of the disengager vessel 49 where the temperature is the lowest, and at the same time reducing hydrocarbon residence time inside the vessel. Consequently, no coke is formed inside the disengager vessel 49 over a period of time. At least one external collector pipe 43 can be horizontally attached close to the lower nozzle of the legless cyclone 42, ensuring that no catalyst will be released into the collector pipes 43. Furthermore, the ends of the collector pipes 43 can be given various shapes for this same purpose.

The main function of the telescoping joint 45 is merely to accommodate expansion due to temperature changes in the system, and not to collect gases coming from the disengager vessel, as described in the prior art, since these gases are preferably captured by at least one external collector pipe 43.

In another aspect, the present invention describes a process for disengaging solid and gaseous particles in the fluid catalytic cracking (FCC) of hydrocarbons processes, reducing coke formation in disengager vessels that use the system of the present invention. The processes for disengaging solid particles in FCC processes, by using closed cyclones, available in prior art, comprise the following steps: a) feeding a suspension made up of cracking reaction products mixed with the catalyst in a closed cyclone disengaging system to cause disengaging of the gaseous and particulate phases, with the gaseous current flowing into the fractionation system, through the outlet duct 48; b) collecting the particulate phase in the bottom of the disengager vessel 49, from where it flows to the rectification and regeneration zone; c) purging the stagnated areas of the disengager vessel 49 by injecting purge liquid through the injector devices 40; d) draining off the hydrocarbons recovered in the rectifier and the steam injected into the disengager vessel and the rectifier through the annular space in the telescoping joint 45 or through pipes inside the legless cyclone.

The process of the present invention modifies FCC process steps.

Accordingly, in step d), the gases coming from the disengager vessel 49 are drained off through at least one collector pipe 43 outside the legless cyclone 42, avoiding the passage of hydrocarbons through the top of the disengager vessel, where the temperature is lower.

In step b), a minimum of the catalyst disengaged through the lower nozzle of the legless cyclone 42 is released by the gases drained off through the outside collector pipes 43.

In yet another aspect, the present invention describes a device for disengaging solid and gaseous particles in fluid catalytic cracking (FCC) processes, reducing coke formation in disengager vessels that use the system of the present invention, comprising at least one external collector pipe 43 whose upper end opens into the pipe 46a above the cyclone 42; the pipe 43 points vertically downward, with the lower end of the pipe 43 opening into the disengager vessel 49.

The present invention provides a system for reducing coke formation in disengager vessels that use the system of the present invention without increasing release of the disengaged catalyst.

Accordingly, the present invention provides a device fitted with at least one external collector to optimize the capture of gases coming from the disengager vessel while avoiding coke formation inside the vessel.

The present invention provides a process that minimizes the route taken by hydrocarbons coming from the rectifier in the disengager vessel 49 until being captured by the collector pipes 43 and carried to the top of the legless cyclone 42, at the same time ensuring that the hydrocarbons cannot enter the area of the disengager vessel 49 with a lower temperature, which lies between the lower end of the legless cyclone 42 and the top of the disengager vessel 49.

BRIEF DESCRIPTION OF THE DRAWINGS

FIG. 1, attached, illustrates the prior art system described in the Applicant's Brazilian patent PI 9303773, which has an unconfined cyclone disengager device, comprised of a cyclone 12 without a sealing leg connected by concentric pipes 16a, 16b to a primary cyclone 17a, said cyclone 17a connected to the secondary cyclone 17b by means of piping 18a.

The disengaged gases exit the disengager vessel 19 through the outlet duct 18b.

The legless cyclone 12 opens at its lower end directly into a large-volume disengager vessel 19. Optionally, the cyclone 12 may have distributors of solids 12a at its lower nozzle for directing the downward flow of disengaged catalyst particles.

The annular space between the pipes 16a, 16b connects the inside of the piping to the disengager vessel 19. Gases coming from the disengager vessel 19 are drained off through this opening.

The stagnated areas of the disengager vessel 19 are purged with the help of purge liquid injector devices 10.

FIG. 3A, attached, illustrates the straight section of the prior art telescoping joint described in the Applicant's Brazilian publication PI 9901484. This figure shows the concentric pipes 34, 36 equipped with a telescoping joint 35, which comprises a slip ring 35a.

DETAILED DESCRIPTION OF THE INVENTION

The present invention as described below relates to the Figures attached hereto, not to be construed as limitative.

One embodiment of the present invention, shown in FIG. 4, is an illustrative example, not to be construed as limitative, of the system of the present invention, comprising a disengager vessel 49 that receives the catalyst/load mixture coming from the riser 41 directly interconnected to one or more legless cyclones 42. The top of each cyclone 42 is fitted with at least one external collector pipe 43. The lower nozzle of each legless cyclone 42 opens directly into the disengager vessel 49.

The pipes 46*a*, 46*b* carry the effluent gases from the legless cyclones 42 to the first-stage cyclones 47.

Gases exit through the pipe 48.

The connection between the pipes 46*a*, 46*b* optionally comprises a telescoping joint 45 for accommodating expansion of the system due to temperature changes.

At least one external collector pipe 43 is intended for collecting hydrocarbons coming from the rectifier and most of the steam injected into the disengager vessel and rectifier in an area close to where the catalyst and hydrocarbons from the legless cyclone 42 are discarded, thus preventing the hydrocarbons from circulating in the area of the disengager vessel 49 where the temperature is the lowest and reducing their residence time inside the disengager vessel 49, inasmuch as contact of these hydrocarbons with the catalyst in low-temperature areas, and their presence inside the disengager vessel 49, can result in condensation and thermal cracking, responsible for coke formation.

Accordingly, at least one external collector pipe 43 facilitates the removal of hydrocarbons and steam from the disengager vessel 49, preventing these gases from stagnating inside the disengager vessel while undergoing prolonged exposure to the catalyst at a temperature that will allow for condensation of the heaviest components of the hydrocarbon mixture.

Collected gases are directed to the upper pipe 46*a* of the legless cyclone 42, said gases channeled through the piping 46*b* to one or more first-stage cyclones 47 before exiting the disengager vessel 49 through the piping 48.

Purge liquid injector devices 40 help to drain off the gases stagnated in the disengager vessel 49. In one embodiment of the present invention, the distributor pipe 46*b* combines one or more systems of legless cyclones 42 and primary cyclones.

The number of external collector pipes 43 may vary, depending on the number of legless cyclones 42 or flow distributors.

Optionally, the cyclone 42 may have one or more distributors of solids 42*a* on its lower nozzle so as to improve the downward flow of disengaged catalyst particles.

Figure 6:
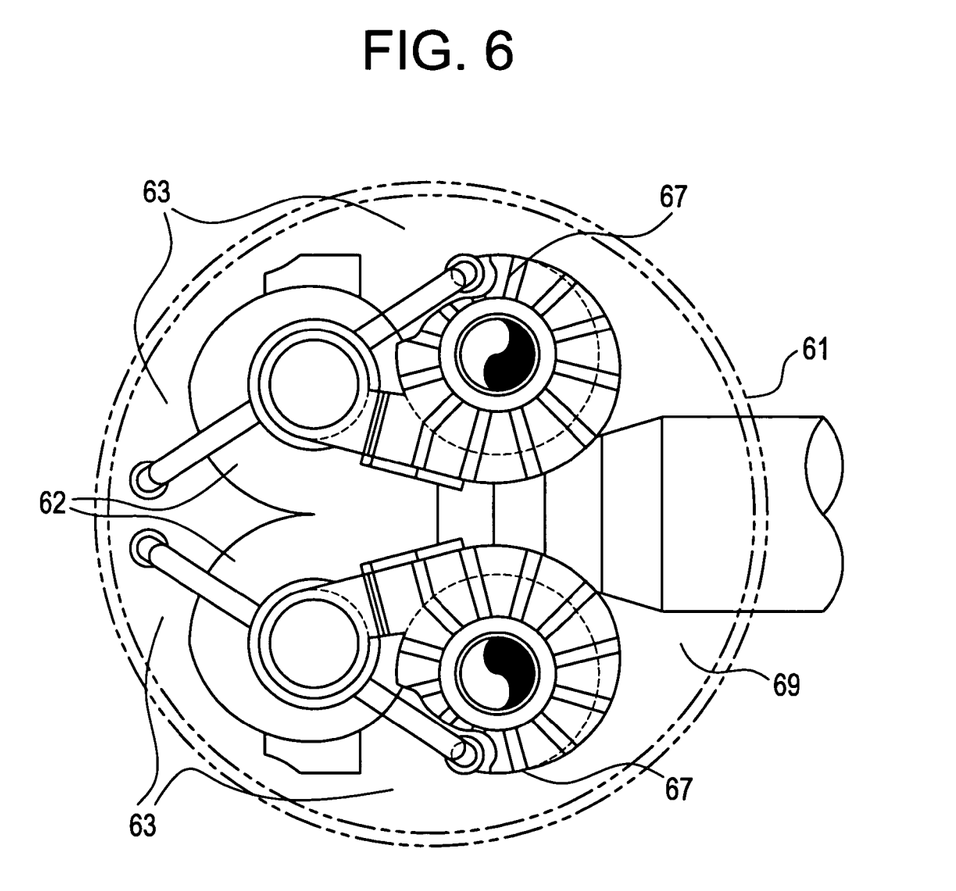
FIG. 6, attached, shows a top view of a horizontal cutaway of the disengager vessel 69 in one embodiment of the system of the present invention, wherein the riser 61 is directly connected to two legless cyclones 62, each of them connected to two external collector pipes 63. In this illustrative example, not to be construed as limitative, each legless cyclone 62 is connected to a first-stage cyclone 67 through concentric pipes. Flow distributors are not shown in this drawing.

Another embodiment of the system of the present invention is shown in FIG. 6, with a vertical, cutaway front view of the disengager vessel 69, wherein the riser 61 is directly connected to two or more legless cyclones 62, each of which is connected to one or more external collector pipes 63.

In this illustrative example, each legless cyclone 62 is connected to a second-stage cyclone 67 through concentric pipes.

Flow distributors are not shown in this illustrative example of the system of the present invention.

In accordance with prior art, in one standard fluid catalytic cracking (FCC) process the hydrocarbon load is mixed with a suspension of catalyst particles in a catalytic cracking zone. Said load is cracked in the riser and piped into a disengager vessel.

The process for disengaging solid and gaseous particles in processes for fluid catalytic cracking (FCC) of hydrocarbons comprises the following steps:

a) feeding a suspension comprising the cracking reaction products mixed with catalyst in an unconfined cyclone disengaging system to cause disengaging of the gaseous and particulate phases, with the gaseous current flowing into the fractionation system through the outlet duct 48;

b) collecting the particulate phase in the bottom of the disengager vessel 49, from where it flows to the rectification and regeneration zone;

c) purging the stagnated areas of the disengager vessel 49 by injecting purge liquid through the injector devices 40;

d) draining off the hydrocarbons recovered in the rectifier and the steam injected into the disengager vessel and the rectifier.

In closed, unconfined systems, hydrocarbons are removed through the annular space in the telescoping joint 45 or through pipes inside the legless cyclone.

The present invention modifies process disengagement steps b) and d).

In step d), the gases coming from the disengager vessel 49 are drained off through at least one collector pipe 43 outside the legless cyclone 42, avoiding the passage of hydrocarbons into the top of the disengager vessel, with its lower temperature.

In step b), a minimum of the catalyst disengaged through the lower nozzle of the legless cyclone 42 is released by the gases drained off through the external collector pipes 43.

In yet another aspect, the present invention is equipped with a device for reducing coke formation in disengager vessels, comprising at least one external collector pipe 43 whose upper end opens into the pipe 46*a* above the said legless cyclone 42, pointed vertically downward, with the lower end opening into the disengager vessel 49.

At least one collector pipe 43 is installed in such a way as to keep the spent and previously disengaged catalyst from going back into the legless cyclone 42.

The invention claimed is:

1. A cyclone system for disengaging solid and gaseous particles which is in association with a FCC reactor and which reduces coke formation in a disengager vessel that receives a catalyst/load mixture from a riser, comprising at least one legless cyclone connected to at least one cyclone in consecutive stages through concentric pipes wherein the at least one legless cyclone is fitted with at least one collector pipe outside the at least one legless cyclone.

2. The system of claim 1, wherein the system reduces coke formation inside the disengager vessel without causing spent catalyst to be released inside the system.

3. The system of claim 1, wherein the system maintains the overall efficiency of the disengagement and the integrity of the cyclones during run time.

4. The system of claim 1, wherein the at least one collector pipe is positioned outside to keep spent and previously disengaged catalyst from being released into the cyclones in consecutive stages.

5. The system of claim 1, wherein the at least one collector pipe has a device at its end to keep spent and previously disengaged catalyst from being released into the at least one cyclone in consecutive stages.

6. The system of claim 1, wherein a connection between the concentric pipes that interconnect the cyclones in different and consecutive stages is fitted with a telescoping joint with minimized annular space.

7. The system of claim 1, wherein a connection between the concentric pipes interconnecting the cyclones in different and consecutive stages is fitted with a sealed telescoping joint.

8. The system of claim 1, wherein a connection between the concentric pipes interconnecting the cyclones in different and consecutive stages has no telescoping joint.

9. The system of claim 1, wherein a lower nozzle of the at least one legless cyclone is fitted with distributors of solids.

10. The system of claim 1, wherein a lower nozzle of the at least one legless cyclone has no distributors of solids.

11. The system of claim 1, wherein the system comprises at least one flow distributor between cyclones in the same stage.

12. The system of claim 1, wherein the system comprises at least one flow distributor between cyclones in different stages.

13. The system of claim 1, wherein the system has no flow distributors between cyclones in equal stages.

14. The system of claim 1, wherein the system has no flow distributors between cyclones in different stages.

15. The system of claim 1, wherein each stage comprises at least one external collector pipe.

16. The system of claim 1, wherein the system further comprises at least one purge liquid injector device.

17. The system of claim 1, wherein an upper end of the at least one collector pipe opens up into the concentric pipes above the at least one legless cyclone.

18. The system of claim 1, wherein the at least one collector pipe points vertically downward.

19. The system of claim 1, wherein a lower end of the at least one collector pipe opens up into the disengager vessel.

20. The system of claim 1, wherein the at least one collector pipe allows for various shapes that prevent the release of catalyst into the at least one cyclone in consecutive stages.

* * * * *